United States Patent
Hasselbach et al.

(10) Patent No.: US 8,701,446 B2
(45) Date of Patent: Apr. 22, 2014

(54) ROTARY SEPARATOR FOR MINERAL FIBERS

(75) Inventors: John Hasselbach, Granville, OH (US); Michael E. Evans, Granville, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 1234 days.

(21) Appl. No.: 11/779,866

(22) Filed: Jul. 18, 2007

(65) Prior Publication Data

US 2008/0011020 A1    Jan. 17, 2008

Related U.S. Application Data

(62) Division of application No. 10/809,211, filed on Mar. 25, 2004, now Pat. No. 7,264,422.

(51) Int. Cl.
*C03B 37/16*    (2006.01)

(52) U.S. Cl.
USPC ................... 65/505; 65/519; 65/536

(58) Field of Classification Search
USPC ............................ 65/536, 505, 519
See application file for complete search history.

(56) References Cited

U.S. PATENT DOCUMENTS

| | | | |
|---|---|---|---|
| 2,377,401 A | 6/1945 | Carlson et al. | |
| 3,442,633 A | 5/1969 | Perry | |
| 3,628,313 A | 12/1971 | Broadbent | |
| 4,124,363 A * | 11/1978 | Kawai | 65/443 |
| 4,167,404 A * | 9/1979 | Loeffler et al. | 65/476 |
| 4,226,715 A * | 10/1980 | Niederer et al. | 210/783 |
| 4,243,280 A * | 1/1981 | Deconinck | 312/140 |
| 4,360,369 A | 11/1982 | Niederer | |
| 4,377,401 A | 3/1983 | Laughlin | |
| 4,382,857 A | 5/1983 | Laughlin | |
| 4,447,249 A | 5/1984 | Kopena | |
| 4,689,143 A | 8/1987 | Miers | |
| 4,737,180 A * | 4/1988 | Schlachter | 65/443 |
| 4,810,270 A | 3/1989 | Terry et al. | |
| 4,909,817 A | 3/1990 | Gill et al. | |
| 5,246,653 A * | 9/1993 | Horres | 264/113 |
| 5,268,015 A | 12/1993 | Furtak et al. | |
| 6,171,492 B1 * | 1/2001 | Hedgepeth et al. | 210/243 |
| 6,364,579 B1 | 4/2002 | Gerber | |

FOREIGN PATENT DOCUMENTS

| | | |
|---|---|---|
| DE | 3131174 | 2/1983 |
| EP | 781927 | 12/1999 |
| JP | 5-254001 | * 10/1993 |

* cited by examiner

*Primary Examiner* — John Hoffmann
(74) *Attorney, Agent, or Firm* — Fraser Clemens Martin & Miller LLC; Charles F. Charpie

(57) ABSTRACT

A method and apparatus for collecting and forming loose fill fiber material from an ail stream includes introducing a combined fiber and air stream onto a surface of a rotatable drum. The rotatable drum allows the air to flow through the surface of the drum while collecting the fiber material on the surface of the drum. The collected fiber material is then removed from the drum surface by a blow off header that is internal to the drum.

14 Claims, 5 Drawing Sheets

ROTARY SEPARATOR FOR MINERAL FIBERS

This application is a divisional of U.S. patent application Ser. No. 10/809,211, filed Mar. 25, 2004, which is hereby incorporated by reference in its entirety.

BACKGROUND OF THE INVENTION

This invention relates in general to the production of mineral fiber material, particularly of such materials as glass fiber. Specifically, the invention relates to a separator for separating produced fiber material from an airstream.

In the manufacture of mineral fiber insulation, the mineral fibers are usually formed from molten mineral material using fiberizers. In the typical manufacturing operation the molten mineral material is introduced into a plurality of fiberizers. The molten material is generated in a melter or furnace and is delivered to the fiberizers by way of a forehearth having a series of bushings. The fiberizers centrifuge the molten material and cause the material to be formed into fibers that are directed as a stream or veil to a collection unit. The veils from typical fiberizing processes include large volumes of air and hot gases in which the mineral fibers are entrained.

In the production of fibrous loose fill material for such uses as blowing wool for insulation, the mineral fibers are typically formed into a blanket or mat and then cut or chopped into tufts, flakes or other particulate insulation bodies. In an alternative process, the mineral fibers are collected from the fiberizers, and then collected or bagged without being formed into a blanket or mat U.S. Pat. No. 4,909,817 to Gill et al., discloses one such method of producing such a loose fill material. In the Gill patent a typical fiberizing station is illustrated. A plurality of fiberizers receive molten glass material from a forehearth. The fiberizers each produce a veil of glass fibers which are directed downwardly toward a collection member or funnel. The downward flow of the veil can be enhanced and controlled by the use of an airflow system that directs the veil to a given area. In the Gill patent, the collection member intercepts the glass veil supplied by the fiberizer and the collection member then diverts the fibers and flow of gases to a separator and ultimately to a packaging machine.

It would be advantageous to provide a system of manufacturing a loose fill fibrous material including a system that can separate the directing air flow from the loose fill material

SUMMARY OF THE INVENTION

The invention relates to a method and apparatus for separating fibers from a flow of air and fibers. The method includes intercepting the flow of air and fibers with a rotating drum where the drum has a plurality of perforations formed on an outer circumferential wall. A zone of reduced pressure is established inside the drum causing the flow of air to pass through the perforations. This separates the fibers from the flow of air. The flow of air is vented away from the zone of reduced pressure and the fibers are collected on the outer circumferential wall. A zone of increased pressure is established inside the drum which causes the mini-blankets to be forced away from the outer circumferential wall of the drum.

The apparatus includes a fiberizer for forming a fibrous mineral material. An air flow producing member blows the fibrous material in a predetermined direction towards a gathering member adapted to receive the formed fibrous mineral material and the air flow. A duct member is positioned between the gathering member and a separator for conveying the formed fibrous material and the air flow to the separator. The separator includes a rotatable drum member that is adapted to receive the fibrous mineral material on an outer surface of the drum member. The outer surface of the drum member is permeable to the air flow. Optionally, the rotatable drum includes a blow off header within the drum that is adapted to drive the received fibrous materials from the surface of the drum when actuated.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

For the purposes of simplicity and clarity, the invention will be described in terms of glass fiber manufacturing, but the inventive method and apparatus are applicable as well to the manufacture of fibrous products of other mineral materials, such as rock, slag and basalt.

Figure 1:
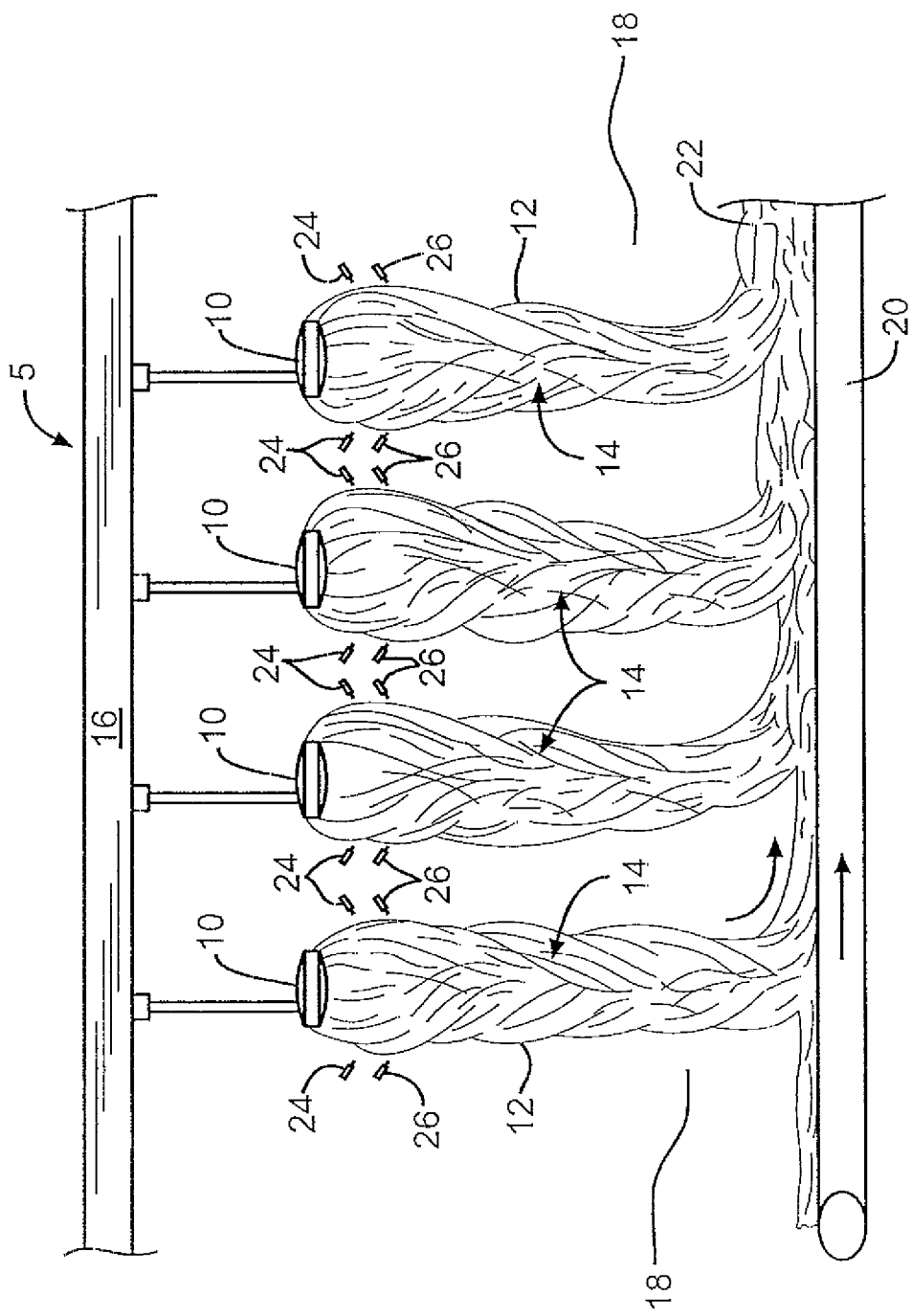
FIG. 1 is a schematic representation in elevation of apparatus for manufacturing glass fibers.

An example of a conventional glass fiberizing apparatus 5 is shown in FIG. 1. A plurality of fiberizers 10 receive molten glass material from a forehearth 16. In a conventional glass fiber insulation manufacturing apparatus, a plurality of fiberizers 10 generate veils 14 of glass fibers 12 and hot gases. The veils 14 are directed downwardly through a chamber or forming hood 18, and onto a foraminous collecting conveyer 20, which gathers the glass fibers into a continuous mat or blanket 22. The travel of the veils 14 through the forming hood 18 enables the fibers and accompanying hot gases to cool considerably by the time they reach the conveyor 20. Typically, the fibers and gases reaching the conveyor 20 are at a temperature no greater than about 300 degrees Fahrenheit. Water sprayers 24 spray fine droplets of water onto the hot gases in the veil to help cool the flow of hot gases. Sprayers 26, positioned beneath the water sprayers 24, are used to direct a resinous binder onto the downwardly moving glass veils 14.

Figure 2:
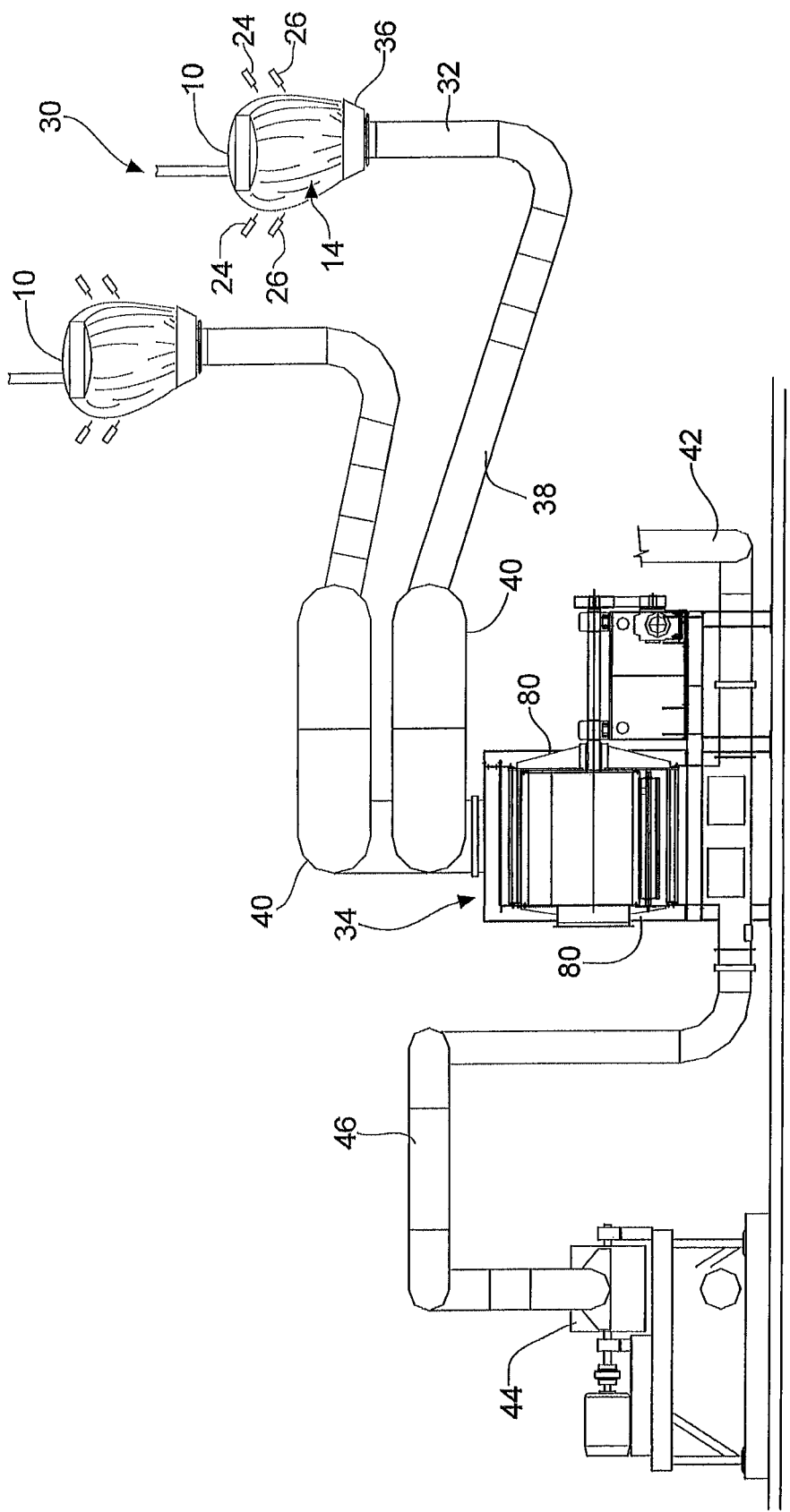
FIG. 2 is a schematic representation in elevation of apparatus for manufacturing loose fill glass fiber insulation material.

In FIG. 2, there is illustrated a glass fiber manufacturing apparatus, indicated generally at 30, for making loose fill insulation according to the method and apparatus of the present invention. The glass fibers 12 can be created, using a plurality of fiberizers 10 that are preferably the same as the fiberizers 10 shown in FIG. 1. It is to be understood that any number of fiberizers 10 can be employed with the invention. The apparatus 30 can include spraying mechanisms, similar to the sprayers 24 and 26 shown in FIG. 1. However, according to the present invention, there preferably are no binder materials applied to the glass fibers 12 formed by each fiberizer 10. Instead, a lubricant material, such as a silicone compound or an oil emulsion, for example, can be applied to the glass fibers 12 to prevent damage to the glass fibers 12 as they move through the manufacturing apparatus 30 and come into contact with apparatus components as well as other glass fibers 12. The lubricant will also be useful to reduce dust in the ultimate product. Typically, the final glass wool product contains about 1 percent oil by weight, although other concentrations can be used.

Once the surface treatment is applied to the glass fibers 12, a gathering member 32 receives the glass fibers 12. The gathering member 32 is preferably adapted to receive both the glass fibers 12 and the accompanying flow of hot gases in the veil. The downward flow of gases in the veil 14 is created by an annular blower, not shown, and an annular burner, also not shown, connected with the fiberizing apparatus 10. The momentum of the flow of gases will cause the glass fibers 12 to continue to move through the gathering member 32 and to a separator 34, where the fibers 12 are separated from the gases with which the fibers are flowing. Alternatively, or additionally, there can be another blowing device, not shown, that draws the glass fibers 12 towards the separator 34.

The veils of the glass fibers 12 created by the fiberizer 10 are preferably intercepted by the gathering member 32 at a point directly beneath the fiberizer 10, the water spray ring 24 and the surface treatment sprayer 26. At the upper end of the gathering member 32 is an entrance section 36, which is preferably funnel-shaped or frusto-conically shaped to better collect substantially all of the fibers and gases in the veil. The gathering member 32 directs the intercepted glass fibers 12 and gases through a duct 38 for transfer to the separator 34. The gathering member 32 and the duct 38 can be any generally hollow conduits suitable for conveying the glass fibers 12 and associated gases to the separator 34. Preferably there are a minimal amount of directional changes in the duct 38 so that the flow of air and fibers can be more efficiently transferred from the fiberizer 12 to the separator 34. Where the apparatus 30 includes a plurality of fiberizers 10, preferably each fiberizer 10 has associated with it an individual gathering member 32. However, a gathering member 32 can be adapted to receive the glass fibers 12 and associated gases from multiple fiberizers 10.

Positioned between the separator 34 and each fiberizer 10, there preferably is a header system 40. The header system 40 is a chamber in which fibers from the plurality of fiberizers 10 can be combined while controlling flow requirements. Preferably, the header system 40 includes a control system, not shown, for combining flows of the glass fibers 12 and gases from various fiberizers 10 and directing the combined flows to various separators 34 of a collection of separators as needed. Such a header system 40 can allow for maintenance and cleaning of the fiberizers 10 without the necessity of shutting down the entire apparatus 30, and without requiring the remaining fiberizers 10 to be shut down while one fiberizer is not operating. The header system 40 can optionally incorporate any suitable means, many of which are known to those skilled in the art, for controlling and directing the glass fibers 12 and their associated air flows.

An air flow exhaust duct 42 is connected to the separator 34 to exhaust gases separated from the fibers in the separator 34. The duct 42 is preferably connected with a fan (not shown) that is used to draw the glass fibers 12 towards the separator 34. From the separator 34, the separated fibers are transported to a processing station 44 via a transfer duct 46. As with the ducts described above, the transfer duct 46 is a generally hollow pipe or other conduit suitable for handling the fibrous materials 12 and any associated gases.

Figure 3:
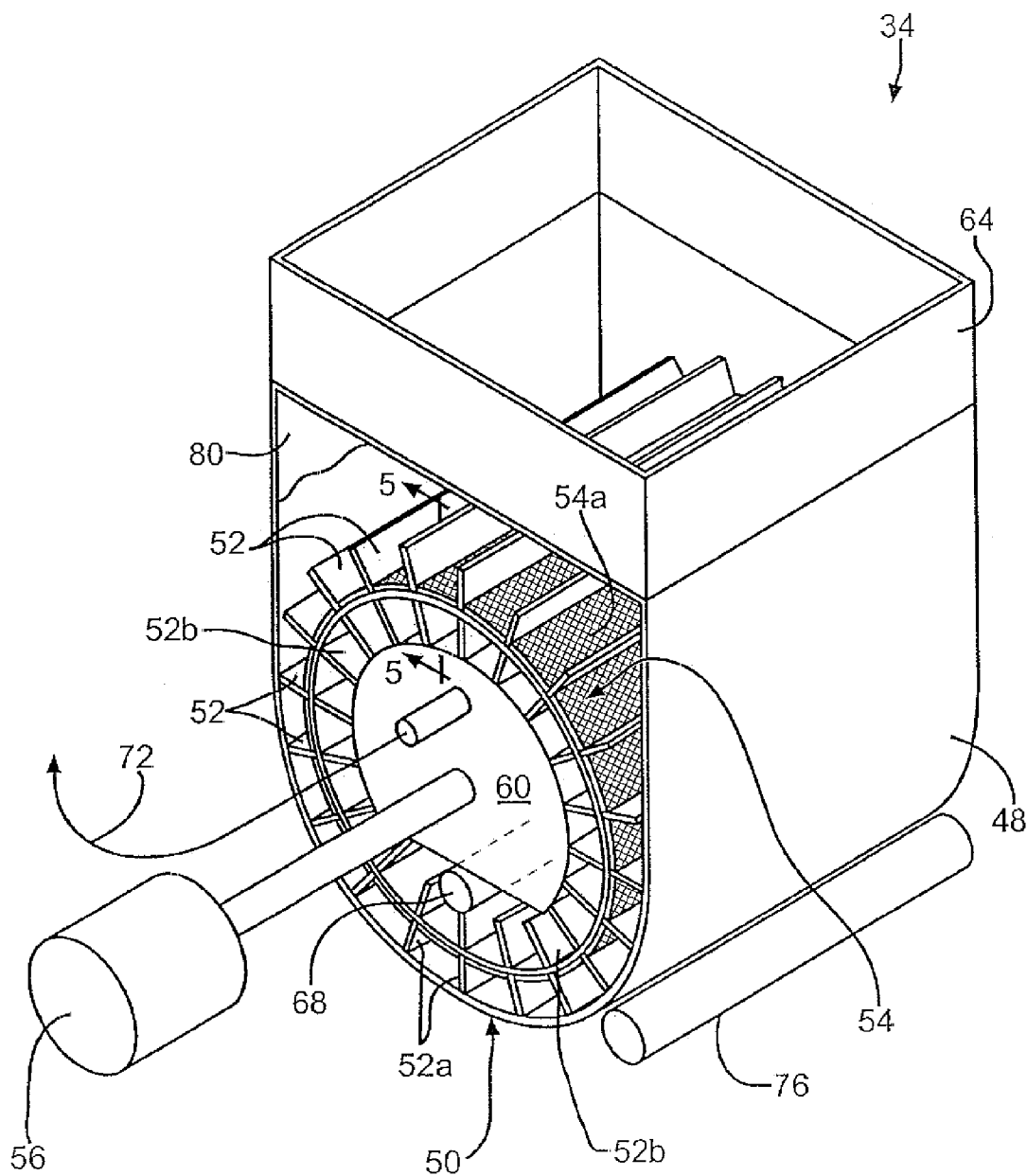
FIG. 3 is an isometric view of a separator for separating the glass fibers from the flow of gasses.
Figure 4:
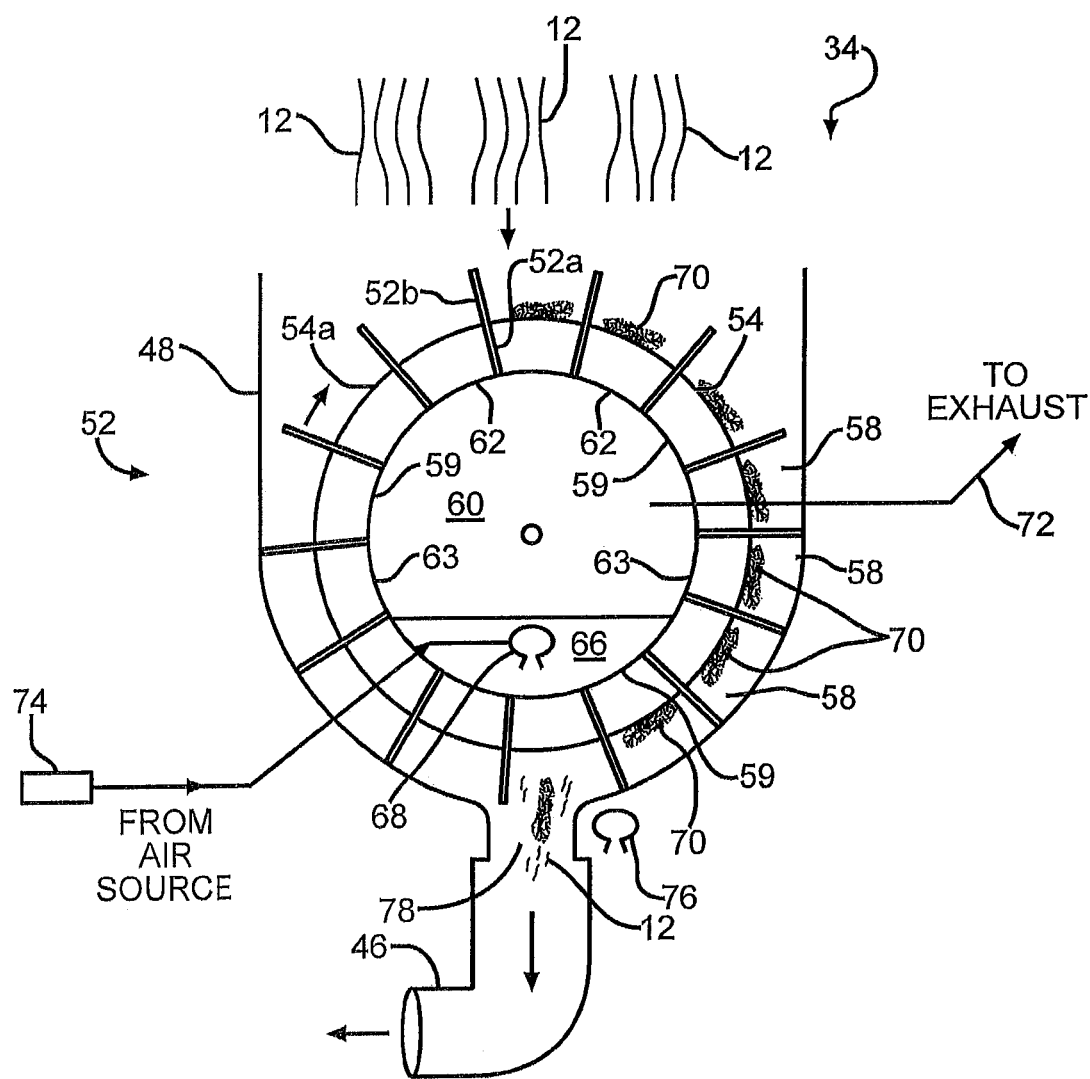
FIG. 4 is an elevational view in cross-section of the separator shown in FIG. 3.

Referring now to FIGS. 3 and 4, the separator 34 according to the present invention is shown in more detail. The separator includes a stationary outer housing or outer casing 48. In FIG. 3, almost all of the end wall 80 of the separator 34 has been removed for purposes of illustration so that the inner portion of the separator 34 can be more clearly seen. Positioned within the separator 34 is a rotatable drum 50. The drum 50 is a generally cylindrical component that can be rotatably driven by any suitable means, preferably a variable speed AC or DC motor 56. The outer surface or outer circumferential wall 54 of the rotatable drum 50 is a foraminous or perforated surface. The perforations 54a are sized to allow the gases to flow through the perforations 54a but to prevent the fibers of the glass fibers 12 from passing through the perforations 54a.

Positioned within the rotating drum 50 is a stationary plenum or inner chamber 60. The inner chamber 60 is connected to the air flow exhaust duct 42 to exhaust gases from within the inner chamber 60. The exhausting or venting of the gases from the inner chamber 60 to the air flow exhaust duct 42 is indicated schematically in FIG. 4 by the arrow 72. The exhausting of the inner chamber 60 creates a zone of reduced pressure within the inner chamber 60, i.e., a condition in which the pressure is less than that of the outside atmosphere. It is to be understood that any mechanism suitable for creating reduced pressure within the inner chamber can be used. The inner chamber 60 is porous over an upper portion 62 of its wall 59 so that air and other gases can flow through the perforated circumferential wall 54 and be drawn into the zone of reduced pressure established in the inner chamber 60. Lower portions 63 of the inner chamber wall 59 are not perforated and are impervious to air flow.

The drum 50 has a plurality of vanes 52 extending through and spaced about its outer circumferential wall 54. Each of the vanes 52 preferably extends in a direction that is substantially transverse to the outer circumferential wall 54 and is carried with the drum 50 as the drum rotates. It can be appreciated that the vanes 52 can have any suitable orientation, i.e., angle with respect to the circumferential wall 54, as long as the vanes 52 can contact the outer casing 48. In the preferred embodiment, the vanes 52 extend in a direction normal to the surface of the outer circumferential wall 54 of the drum 50. The space defined by any two adjacent vanes 52, the outer circumferential wall 54, and the outer casing 48, can be referred to as a compartment 58. Each compartment 58 is adapted to receive glass fibers 12 that are collected on the outer circumferential wall 54. The fibers 12 collected within a compartment 58 are initially loosely held together by suction from the inner chamber, and the fibers within a chamber can be viewed as a small blanket or mini-blanket 70 of the glass fibers 12 within the compartment 58.

The vanes 52 are comprised of an inner vane portion 52a and an outer vane portion 52b. The outer vane portion 52b is the vane portion that defines the compartments 58 and forms a seal with the outer casing 48. The inner vane portion 52a separates the inner chamber 60 from the outer circumferential wall 54 of the drum 50 and the compartments 58. Thus, the inner vane portions 52a act to form an inner seal between the inner chamber 60 and the compartments 58 of the drum 50, and provide a barrier to peripheral flow around the drum. The inner vane portions 52a are illustrated so that they appear to be at the same general positions as the outer vane portions 52b, i.e., collinear. However, the inner and outer vane portions 52a and 52b do not necessarily have to be positioned as such and can be staggered relative to each other.

To facilitate the creation of the zone of reduced pressure within the inner chamber, it is preferred that the vanes 52 are positioned such that several of the outer vane portions 52b, also known as wiper seals, are in contact with the outer casing 48 of the separator 34 at all times (as can be seen more clearly in FIG. 4). Thus, the spacing of the vanes 52 about the circumference of the drum 50 is such that as the drum 50 rotates one vane 52 out of contact with the outer casing 48, another vane 52 comes into contact with the outer casing 48. In this manner, air leakage or short circuiting of air into the inner chamber 60 around the vanes 52, between the drum 50 and the outer casing 48, is minimized. The more vanes 52 that are in contact with the walls of the outer casing 48, the more effective and secure the seal. This allows a greater negative pressure to be formed in the inner chamber 60. It is to be understood that the vanes 52 are optional, and other means can be used to assure that the negative pressure can be maintained within the inner chamber 60. Preferably, the vanes 52 ale somewhat flexible so as to provide a relatively tight seal with the outer casing 48. Additionally, the tips of the vanes 52 (or optionally the entire vane) can be made from a flexible high temperature material or a TEFLON impregnated material to further facilitate the seal. TEFLON is commercially available from the DuPont Corporation of Wilmington, Del.

When the drum 50 has rotated to a position where a particular compartment 58 is no longer influenced by the zone of reduced pressure in the inner chamber 60, the glass fibers within the mini-blanket 70 carried within that particular zone can be discharged from the drum 50 and carried away by the transfer duct 46. Preferably, a zone of increased pressure, i.e., greater than atmospheric pressure, is created in a lower chamber 66 within the drum 50. It can be seen that to remove the glass fibers in the mini-blankets 70 from the outer circumferential wall 54 of the drum 50, the compartments 58 carrying the mini-blankets 70 are moved from being influenced by the zone of reduced pressure to a position where the compartments 58 are influenced by the zone of increased pressure. The glass fibers 12 are then forced into the transfer duct 46 by the increased pressure inside the drum 50. The zone of increased pressure can be created by any suitable means, such as a blow off header 68 which is connected with a source of air pressure 74. The blow off header 68 assures that the glass fibers 12 in the mini-blanket are removed from the outer circumferential wall 54, and assists in maintaining the cleanliness of the overall system. Compared to conventional systems, in which materials collected on a rotary drum would simply fall away from the drum by gravity or by a scraping mechanism, in the present invention the collected mini-blankets 70 of material are forced away from the outer circumferential wall 54 of the drum by a positive pressure. Optionally, a second blow off header 76 is positioned adjacent the downwardly opening gap 78 in the outer casing 48 so that the glass fibers 12 are more forcefully blown into the transfer duct 46 and to the processing station 44. The optional second blow off header 76 is preferably positioned in a way that if further cleans the surface of the drum 50. It is preferred that the second header 76 is only used intermittently, for example, once every twenty-four hours, to blow air onto the outer circumferential wall 54 of the drum 50 to remove any excess fibers, dust, or other materials that can diminish the effectiveness of the separator 34. It is to be understood that the fibrous material removed from the drum 50 and passing through the gap 78 can either be in fibrous form or in the form of the mini-blanket 70, or a combination of both forms. Further, it is to be understood that the suction of fans, not shown, associated with transport duct 46 and the processing station 44 may actually create a slightly negative pressure at the lower gap 78, but the blow off header 68 still acts to assure the glass fibers 12 and mini-blankets 70 are removed from the screen.

Once the glass fibers 12 are separated from the flow of air and other gases by the separator 34, the glass fibers are further processed in the processing station 44, which can be, for example, a hammermill or a cubing apparatus for making loose fill insulation material. From the processing station 44, the material is then bagged for storage and transportation to an insulation job site. A zone of reduced pressure can be is created in conjunction with the operation of the processing station 44 in older to draw in the glass fibers 12. The additional air accompanying the fibers 12 traveling to the processing station is beneficial to cool off the glass fibers before packaging. This avoids problems with overheating the packaging materials. It is to be understood that the glass fibers 12 removed from the separator 34 can be processed in any desired manner, including directly bagging the glass fibers 12. It is preferred, however, to fabricate the glass fibers for specific product applications.

Since the glass fibers 12 and hot gases are intercepted by the gathering member 32 and entrance section 36 at a point close to the fiberizer 10, the temperature of the glass fibers 12 and hot gases will exceed the corresponding veil temperatures associated with conventional methods of producing the glass fibers 12. The veils 14 are not allowed to pass through the forming hood 18 as would be the case for a conventional manufacturing process. Thus, the separator 34 and the other components that come into contact with the fibrous materials 12 are of necessity required to be able to accommodate fibrous materials 12 and hot gases having higher temperatures than experienced by conventional fiber handling equipment. The separator 34, for example, must be able to operate at temperatures up to and exceeding about 500 degrees Fahrenheit. The outer circumferential wall 54 of the drum 50 must adapted to operate at this relatively high temperature, and it may also experience relatively high static pressures.

Figure 5:
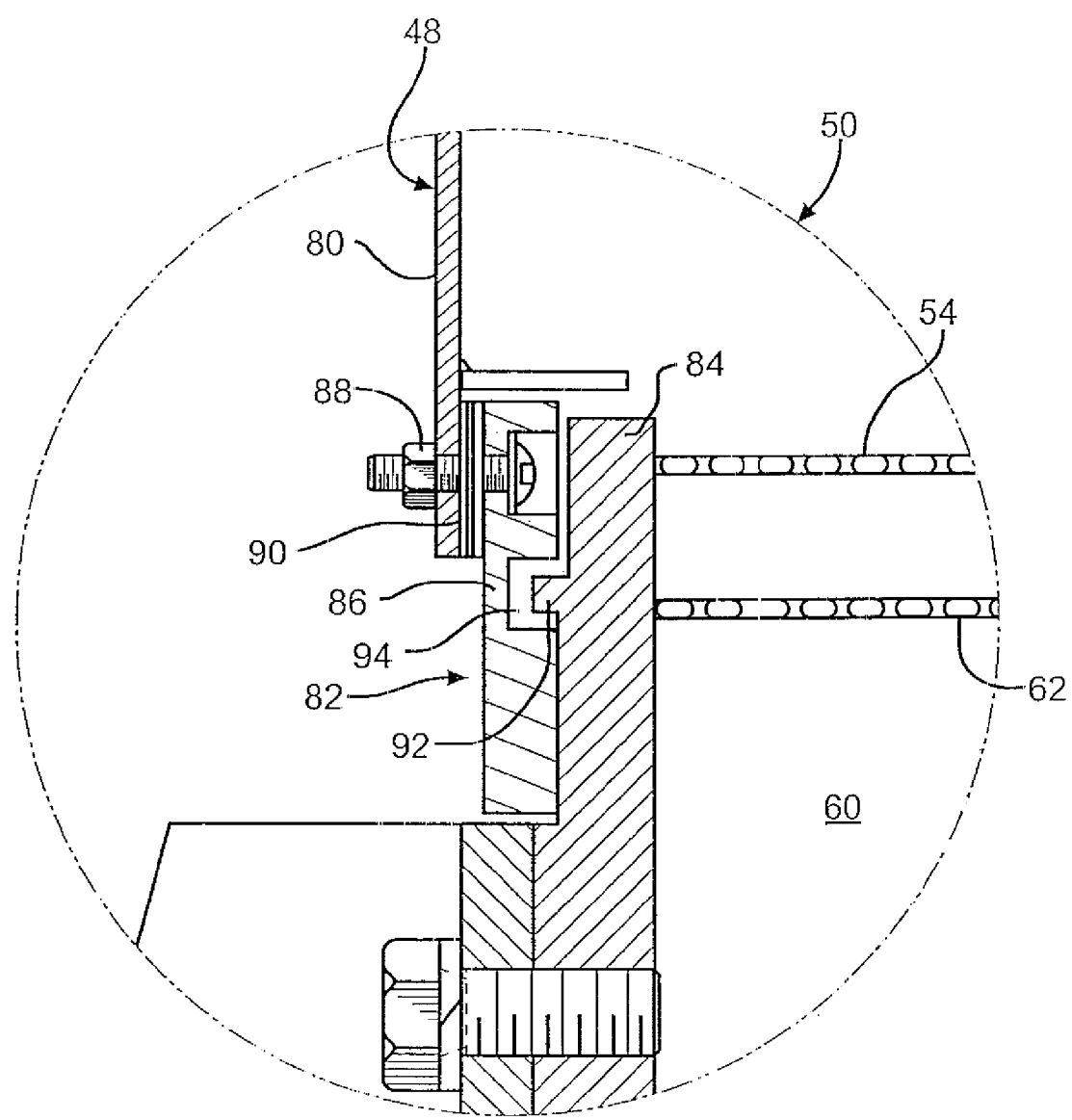
FIG. 5 is a cross-sectional view in elevation of the seal through a wall panel of the outer casing of the separator of FIG. 3, taken along line 5-5 in FIG. 3.

In order to more readily achieve the zone of reduced pressure in the inner chamber 60, the end walls 80 of the outer casing 48, shown in FIGS. 2 and 3, are preferably provided with a robust sealing mechanism. As illustrated in FIG. 5, a seal 82 formed on the end walls 84 of the drum 50 is a labyrinth seal. The labyrinth seal 82 is used to maintain a sealed condition between the zone of reduced pressure in the inner chamber 60 and other regions at higher pressures. The anticipated temperatures of the materials received within the separator 34 are generally higher than in known separators. Therefore, the labyrinth seal 82 is adapted to expand and contract according to the temperatures of the materials received within the separator 34 to maintain the seal. As illustrated in FIG. 5, the end wall 80 of the outer casing 48 is shown connected with a seal member 86 with a threaded fastener 88. Although the seal member 86 is shown as being attached to the end wall 80 using a threaded fastener, it can be appreciated that the seal member 86 can be attached to the end wall 80 using any suitable mechanism. Optionally, positioned between the seal member 86 and the end wall 80 are a plurality of shims 90. It can be appreciated that any suitable spacing mechanism can be used to position the seal member 86 from the end wall 80 as desired.

The end wall 84 of the rotating drum 50 includes an annular protrusion 92 that is received within an annular notch or recess 94 formed in the stationary seal member 86. The protrusion 92 acts as an obstacle to the air flow between the outer edge portion 84 of the drum 50 and the sealing member 86. Although only a single annular protrusion 92 is shown, it can be appreciated that any number of such protrusions can be formed to provide additional sealing surfaces between the drum 50 and the wall 86 of the outer casing 48.

In addition, since the hot fiber materials 12 are received on the outer circumferential surface 54 of the drum 50, it is anticipated that the drum 50 will expand in an outward direction, that is, from an inner portion of the drum 50 towards the wall of the outer casing 48, under the heat and pressure of the received material 12. As illustrated in FIG. 5, the expansion of the drum will be towards the left. In order to maintain the desired seal while allowing for thermal expansion, the outer edge portion 84 can expand towards the seal member 86. The protrusion 92 can expand into the recess 94 of the seal member 86 to maintain the seal as the drum 50 rotates. Thus, the labyrinth seal 82 will allow the overall operation of the drum 50 to continue and the seal to be maintained despite an increase in temperature (and therefore expansion) of the drum 50 and the drum components In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An apparatus for separating fibers from a gas flow comprising:
    a fiberizer configured for forming downwardly moving veils of fibrous mineral material and gas flow;
    a gathering member adapted to receive the formed fibrous mineral material and the gas flow;
    a duct adapted to receive the formed fibrous material and the gas flow from the gathering member;
    a separator configured to receive the formed fibrous material and the gas flow from the duct and further configured to separate the formed fibrous material from the gas flow, the separator including:
    a rotatable drum positioned within the separator, the drum adapted to receive the formed fibrous mineral material on a perforated outer circumferential wall of the drum, with the outer circumferential wall being permeable to the gas flow;
    a wall inwardly spaced apart from the rotatable drum and defining an inner chamber, the wall comprising an upper portion and a lower portion, the upper portion being porous and the lower portion being impervious to air flow, and the inner chamber having a zone for reduced pressure;
    a lower chamber within the drum and having a zone for increased pressure; and
    a mechanism for creating the zone of reduced pressure within the inner chamber of the separator for drawing the gas flow towards the drum.

2. The apparatus defined in claim 1 wherein the outer circumferential wall of the drum is divided into a plurality of compartments by a plurality of vanes, each of the vanes extending in a transverse direction to the circumferential wall of the drum.

3. The apparatus defined in claim 2 wherein at least two vanes positioned on opposite sides of the drum are in contact with walls of the separator thereby sealing the zone of reduced pressure.

4. The apparatus defined in claim 3 wherein the received fibrous material is retained on the drum while the fibrous material is in contact with the zone of reduced pressure, and is removed from the drum after the fibrous material is moved to be outside of the influence of the zone of reduced pressure.

5. The apparatus defined in claim 4 further comprising a labyrinth seal.

6. The apparatus of claim 2, wherein the vanes have an inner vane portion and an outer vane portion, wherein the inner vane portion separates the inner chamber from the outer circumferential wall of the drum and the outer vane portion forms a seal with an outer casing.

7. The apparatus of claim 6, wherein the inner vane portion and the outer vane portion are co-linear.

8. The apparatus defined in claim 1 further comprising a header system positioned between the duct and the separator.

9. The apparatus defined in claim 8 wherein the header system is connected to a plurality of separators.

10. The apparatus defined in claim 8 wherein the header system is configured to combine the flows from a plurality of fiberizers.

11. The apparatus defined in claim 1 wherein components of the apparatus are adapted to operate at temperatures up to and exceeding about 500 degrees Fahrenheit.

12. The apparatus of claim 1, wherein the spaced apart wall has a circular cross-sectional shape.

13. The apparatus of claim 1, wherein a transfer duct is configured to transfer separated fibers from the rotatable drum to a processing station.

14. The apparatus of claim 13, wherein the zone of increased pressure in the lower chamber is connected to a source of air pressure.

* * * * *